United States Patent
Hiura et al.

(10) Patent No.: US 9,310,752 B2
(45) Date of Patent: Apr. 12, 2016

(54) UNIT MOVING DEVICE AND IMAGE FORMING APPARATUS

(75) Inventors: Hiroshi Hiura, Kashiwa (JP); Fumihiko Hayayumi, Abiko (JP); Shinsuke Ubayashi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 13/883,734

(22) PCT Filed: Oct. 19, 2011

(86) PCT No.: PCT/JP2011/005849
§ 371 (c)(1),
(2), (4) Date: May 6, 2013

(87) PCT Pub. No.: WO2012/063412
PCT Pub. Date: May 18, 2012

(65) Prior Publication Data
US 2013/0230335 A1 Sep. 5, 2013

(30) Foreign Application Priority Data
Nov. 9, 2010 (JP) ................................. 2010-251160

(51) Int. Cl.
*G03G 21/16* (2006.01)
*G03G 15/00* (2006.01)
*F16H 21/44* (2006.01)

(52) U.S. Cl.
CPC ............... *G03G 21/16* (2013.01); *F16H 21/44* (2013.01); *G03G 15/6505* (2013.01); *G03G 2215/00383* (2013.01); *G03G 2215/1695* (2013.01); *Y10T 74/18896* (2015.01)

(58) Field of Classification Search
CPC .............. G03G 15/6505; G03G 21/16; G03G 21/1695; F16H 21/44
USPC .................................................... 399/110, 111
See application file for complete search history.

(56) References Cited

U.S. PATENT DOCUMENTS

2006/0180996 A1 8/2006 Iwase
2006/0237898 A1* 10/2006 Mizobe .......................... 271/147

FOREIGN PATENT DOCUMENTS

CN 101844687 A 9/2010
CN 101955074 A 1/2011
(Continued)

OTHER PUBLICATIONS

Akema. Machine Translation of JP 2010143738. Published Jul. 1, 2010. Accessed/translated Dec. 10, 2014.*

*Primary Examiner* — Ryan Walsh
*Assistant Examiner* — Philip Marcus T Fadul
(74) *Attorney, Agent, or Firm* — Canon USA, Inc. IP Division

(57) ABSTRACT

A roller is rotatably provided in an arm that is swingable relative to a main body of an apparatus, and is connected to a tension spring using a wire of a roller shaft. A roller guide portion that guides the roller is provided in a sheet feeding cassette. The roller is guided along a guiding member of the roller guide portion in accordance with insertion of the sheet feeding cassette into the main body of the apparatus. When the roller is guided along the guiding member, an elastic force of the tension spring is accumulated. The sheet feeding cassette is pulled to a mounting position when the roller is guided along the guiding member. The sheet feeding cassette is pushed out also when the roller is guided along the guiding member.

22 Claims, 13 Drawing Sheets

(56) References Cited

FOREIGN PATENT DOCUMENTS

| JP | 2002-226065 A1 | 8/2002 |
| JP | 2004-117395 A | 4/2004 |
| JP | 3834207 B2 | 10/2006 |
| JP | 2010-143738 A | 7/2010 |
| JP | 2010143738 A * | 7/2010 |

* cited by examiner

UNIT MOVING DEVICE AND IMAGE FORMING APPARATUS

TECHNICAL FIELD

The present invention relates to a unit moving device that moves a unit relative to a main body of an image forming apparatus that is equipped with the unit such that the unit can be pulled out of the main body of the image forming apparatus. The present invention also relates to an image forming apparatus equipped with the unit moving device.

BACKGROUND ART

Today, image forming apparatuses that form images on sheets such as printers, facsimile devices, and copying machines are equipped with units that are removably mounted therein. These units can be detached by being slid relative to the main bodies of the image forming apparatuses (hereinafter referred to as the main bodies of the apparatuses). Such units include, for example, sheet feeding units that contain sheets, sheet feeding devices that feed sheets from sheet feeding cassettes, and image forming portions (transfer unit, fixing unit, and the like) that form images on sheets.

After such a unit is pulled out from the main body of the apparatus, the user manually pushes the unit back into the main body of the apparatus in order to mount the unit in the main body of the apparatus. However, sometimes the unit is not sufficiently pushed to a position that is reached when the unit is completely mounted in the main body of the apparatus. In such a case in which the unit is not fully mounted in the main body of the apparatus, when the unit is, for example, a sheet feeding cassette, sheets are not correctly positioned. Thus, situations such as an image being incorrectly formed on the sheet or defective feeding of the sheet (the sheet being fed in a tilted position or sheet jamming) can occur. When the unit is a transfer unit or the like that transfers an image onto the sheet, quality of an image is degraded due to a transfer of the image onto an incorrect position on a transported sheet.

In view of the above-described situation, technologies using mechanisms that assist an operation of pulling the unit have been proposed in order to improve operational properties in mounting and removing the unit by the user. For example, PTL 1 proposes a technology using a unit moving device in a case in which the unit is a sheet feeding cassette. With this technology, the sheet feeding cassette is automatically forced to be pulled to a normal mounting position of the sheet feeding cassette in a main body of an apparatus by a driving unit such as a motor from a position located in front of the normal mounting position.

PTL 2 proposes another unit moving device. According to the document, a protrusion is provided in the sheet feeding cassette, and a rotating body urged by a spring is provided on the side of a main body of an apparatus. When the protrusion goes beyond the rotating body, an elastic force of the spring causes the rotating body to urge the protrusion. In this unit moving device, by urging the sheet feeding device using the protrusion as described above, the sheet feeding cassette is forced to be pulled to a mounting position from a position located in front of the mounting position.

However, there is a problem with the above-described related-art unit moving device. The device uses the driving unit, for example, a motor or the like, in order to force the sheet feeding cassette to be pulled to the normal mounting position in the main body of the apparatus. This makes the structure be complex, thereby increasing the size and cost of the apparatus.

The other related-art unit moving device pulls the sheet feeding cassette using the rotating body urged by the spring. In this case, the size and cost of the apparatus, which increase in the case of the apparatus using the motor, do not increase. However, today, in order to decrease the number of times of replenishment of the sheets in the sheet feeding cassette so as to improve work efficiency of the user, the amount (number) of sheets loaded in the sheet feeding cassette tends to increase. For this reason, the total weight of the sheet feeding cassette loaded with the maximum amount of the sheets increases. Thus, in order to reliably pull the sheet feeding cassette to the normal mounting position in the main body of the apparatus, use of a spring having a large elastic force is highly desirable.

When a spring having a large elastic force is used, in order to move the sheet feeding cassette from the main body of the apparatus, the operation needs be performed against a large spring force. Thus, a larger operational force is required, and accordingly, operability is degraded.

Although the operability of the sheet feeding cassette is described above, similar problems occur in a transfer portion that transfers toner images onto a sheet, or in a transfer unit or a fixing unit of which a fixing device fixing toner images to a sheet can be pulled from the main body of the apparatus. Recently, the number of image forming apparatuses able to form color images has been increasing. Accordingly, in an image forming portion of an image forming apparatus, a plurality of photosensitive drums and a fixing device having a large heat capacity are used. This also increases the size and weight of the image forming portion. For this reason, degradation of work efficiency also occurs in structures that pull these units as is the case with a structure that pulls the sheet feeding cassette.

CITATION LIST

Patent Literature

PTL 1: Japanese Patent Laid-Open No. 2004-117395
PTL 2: Japanese Patent Laid-Open No. 2002-226065

SUMMARY OF INVENTION

The present invention is proposed in view of the above-described problem. The present invention provides a unit moving device with which a large operational force is not required when a unit is pulled out by the operator, and the unit can be reliably pulled into a main body of an apparatus.

According to the present invention, a unit moving device is provided between a main body of an apparatus and a unit that is provided so as to be removable from the main body of the apparatus, and is moved by the unit moving device in the main body of the apparatus. The unit moving device includes an elastic member that generates force in order to move the unit and an accumulator that accumulates an elastic force in the elastic member in an operation in which the unit is inserted to a mounting position in the main body of the apparatus. In the unit moving device, part of the elastic force in the elastic member accumulated while the unit is being inserted into the main body of the apparatus is used to move the unit to the mounting position in the main body of the apparatus, and the elastic force remaining in the elastic member is used to move the unit in a direction in which the unit is pushed out of the main body of the apparatus.

DESCRIPTION OF EMBODIMENTS

First Embodiment

Figure 13:
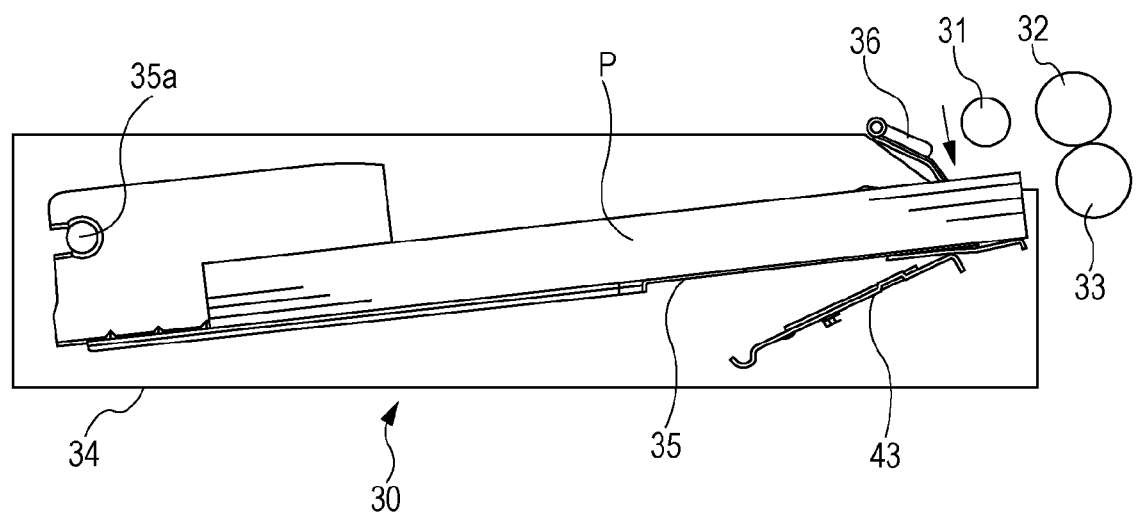
FIG. 13 is a sectional view of a sheet feeding device according to the present invention.
Figure 14:
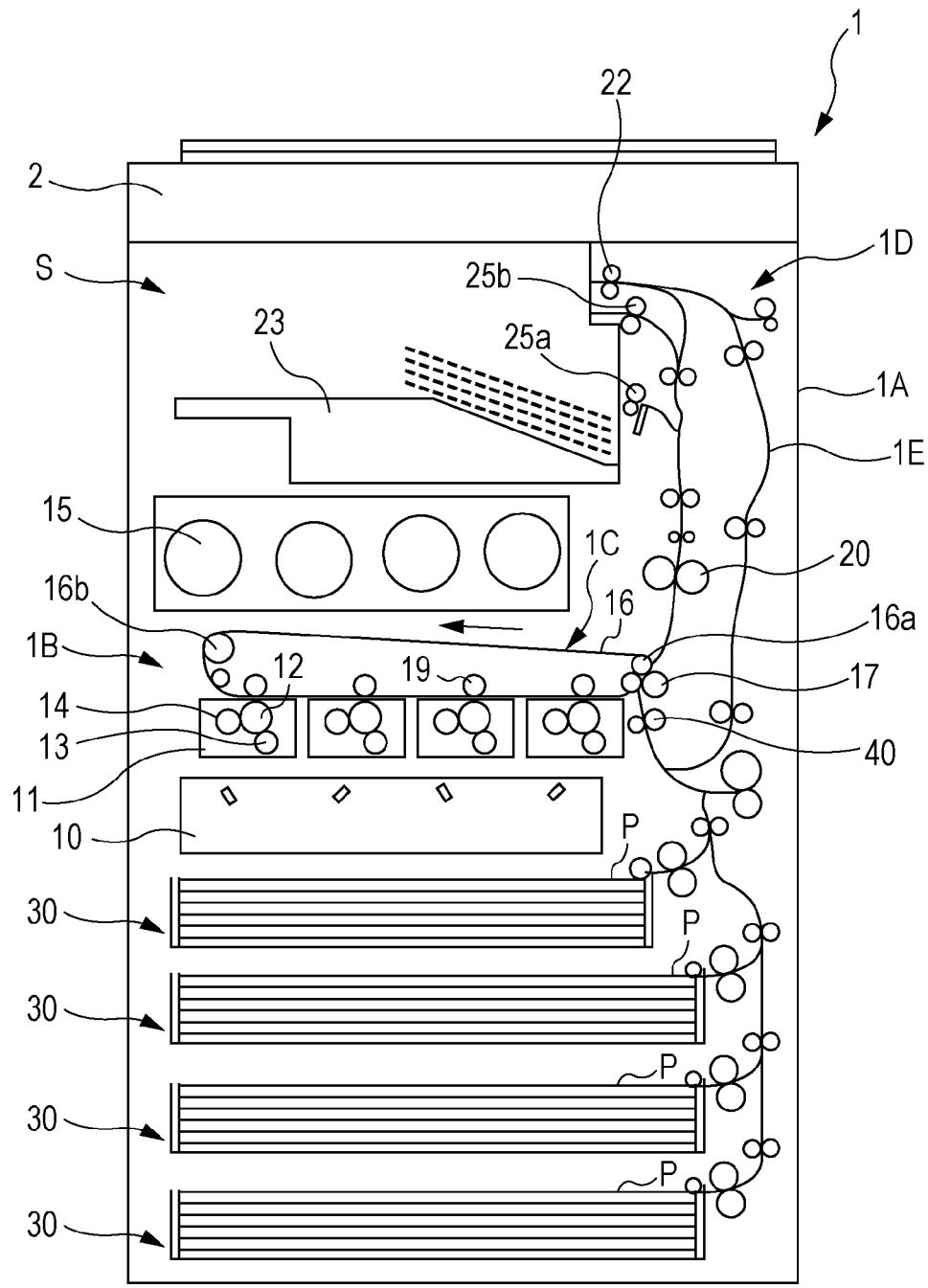
FIG. 14 is a sectional view of an image forming apparatus according to the present invention.

First, a sheet feeding cassette and an image forming apparatus equipped with a unit moving device according to a first embodiment of the present invention will be described with reference to the drawings. FIG. 13 is a sectional view illustrating a sheet feeding device, and FIG. 14 is a sectional view of the image forming apparatus. Although FIG. 14 illustrates a general configuration of a full-color laser beam printer, the present invention is not limited to this, and is applicable to other image forming apparatuses such as a facsimile device and a copying machine.

Referring to FIG. 14, reference numeral 1 denotes a full-color laser beam printer (simply referred to as a printer hereinafter), reference numeral 1A denotes a main body of the printer serving as a main body of an image forming apparatus (a main body of the apparatus), reference numeral 1B denotes an image forming portion that forms an image on a sheet, and reference numeral 20 denotes a fixing portion. Reference numeral 2 denotes an image reading device that is substantially horizontally disposed above the main body of the printer 1A. A sheet output space S, into which a sheet is ejected, is defined between the image reading device 2 and the main body of the printer 1A. Reference numeral 15 denotes a toner cartridge.

The image forming portion 1B, which is a four-drum full-color image forming portion, includes a laser scanner 10 and four process cartridges 11 that each form a toner image in corresponding one of four colors, that is, in yellow (Y), magenta (M), cyan (C), and black (K). Here, the process cartridges 11 each include a photosensitive drum 12, a charger 13 that serves as a charging unit, and a developer 14 that serves as a developing unit. An intermediate transfer unit 1C is also provided above the process cartridges 11.

The intermediate transfer unit 1C includes an intermediate transfer belt 16 and primary transfer rollers 19. The intermediate transfer belt 16 is looped around a driving roller 16a and a tension roller 16b. The primary transfer rollers 19 are disposed inside the intermediate transfer belt 16 and contact the intermediate transfer belt 16 at positions opposite the respective photosensitive drums 12. The intermediate transfer belt 16 is rotated by the driving roller 16a, which is driven by a driving portion (not shown), in an arrow direction. By applying a transfer bias of positive polarity to the intermediate transfer belt 16 using the primary transfer roller 19, the toner images on the corresponding photosensitive drums 12 of the respective colors having negative polarity are sequentially transferred so as to be superposed with each other onto the intermediate transfer belt 16.

At a position opposite the driving roller 16a of the intermediate transfer unit 1C, a secondary transfer roller 17 is provided. The secondary transfer roller 17 is part of a secondary transfer portion that transfers the color image formed on the intermediate transfer belt 16 onto a sheet P. Above the secondary transfer roller 17, the fixing portion 20 is provided. Above the fixing portion 20, a first eject roller pair 25a, a second eject roller pair 25b, and a sheet inverting portion 1D are disposed. The sheet inverting portion 1D includes an inverting roller pair 22, which can rotate in positive and negative directions. The main body of the printer 1A has a sheet return path 1E. A sheet, on one side of which an image has been formed, is again transported to the image forming portion 1B using the inverting roller pair 22.

Next, image forming operations in the printer 1 having a structure as above will be described. Image information of an original copy is initially read by the image reading device 2 and undergoes image processing. After that, the image information is converted into an electrical signal and transmitted to the laser scanner 10 of the image forming portion 1B. Alternatively, image information can be input to the image forming portion 1B from an external device such as a personal computer (not shown). In the image forming portion 1B, surfaces of the photosensitive drums 12 of the respective process cartridges 11 are scanned by laser beams emitted from the laser scanner 10 corresponding to image information of yellow, magenta, cyan, and black component colors. By doing this, the surfaces of the photosensitive drums 12, which are uniformly charged by the charger 13, are sequentially exposed to light. As a result, static latent images in yellow, magenta, cyan, and black are sequentially formed on the respective photosensitive drums 12. Then, the static latent images become visible by being developed using yellow, magenta, cyan, and black toners. The toner images in the respective colors on the corresponding photosensitive drums 12 are sequentially transferred onto the intermediate transfer belt 16 so as to be superposed with each other using the primary transfer bias applied to the primary transfer roller 19. Thus, the toner images are formed on the intermediate transfer belt 16.

In parallel with the toner image forming operation, the sheet P is picked up from a sheet feeding device 30 illustrated in FIG. 13. The sheet feeding device 30 includes a sheet feeding cassette 34, a pickup roller 31, and a separation roller pair. The sheet feeding cassette 34 includes a sheet loading plate 35 on which a sheets P are loaded. The pickup roller 31 is provided in the main body of the apparatus and picks up the uppermost sheet P. The separation roller pair includes a conveying roller 32 and a separation roller 33. The stack of sheets P decreases as the sheets P are fed and transported. The sheet loading plate 35 is controlled using a lifter plate 43 that is swung by a lifter mechanism (not shown). In the control, the sheet loading plate 35 is moved up so as to raise the uppermost surface of the stack of sheets P to a height where the sheet P can be fed. When the sheets P have been fed and the sheet feeding device 30 runs out of the sheet P, the state is detected by a sheet presence/absence detection sensor 36. This causes the paper feeding operation to be stopped and a sheet replenish request message to be indicated on a panel or the like. The user pulls out the sheet feeding cassette 34, replenishes the sheet feeding cassette 34 with a stack of the sheets P, and then pushes the sheet feeding cassette 34 back into the main body of the apparatus.

The sheet P picked up from the sheet feeding cassette 34, in which the stack of sheets P is loaded, is transported to a registration roller pair 40. The registration roller pair 40 corrects a tilted position of the sheet P. Then, the sheet P is supplied to the secondary transfer portion. After that, the secondary transfer portion collectively transfers the toner images onto the sheet P using a secondary transfer bias applied to the secondary transfer roller 17. The sheet P, onto which the toner images have been transferred as described above, is then transported to the fixing portion 20. In the fixing portion 20, the toners of the colors are fused and mixed by being exposed to heat and pressure. As a result, the toner images are fixed onto the sheet P as a color image. After that, the sheet P, onto which the image has been fixed, is ejected to a sheet stacking portion 23 by the first eject roller pair 25a disposed on downstream of the fixing portion 20. In order to form images on both sides of the sheet P, the sheet P having an image formed on one of the sides thereof passes through the fixing portion 20. Then, the sheet P is inverted by the inverting roller pair 22 and transported to the sheet return path 1E. The sheet P passes through the sheet return path 1E and is again transported to the registration roller pair 40. An image is formed on the side of the sheet P opposite the side of the sheet P where the image has already been formed, and the image on the opposite side is fixed. After that, the sheet P is ejected to the sheet stacking portion 23 by the first eject roller pair 25a.

Figure 1A:
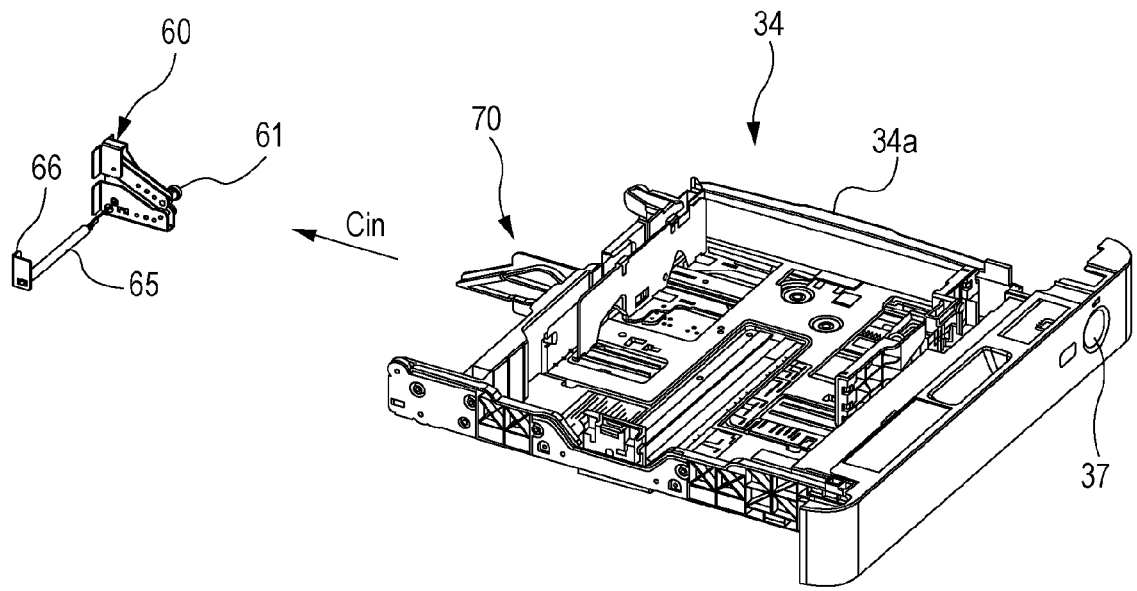
FIG. 1A is a perspective view of a unit moving device according to a first embodiment of the present invention.
Figure 1B:
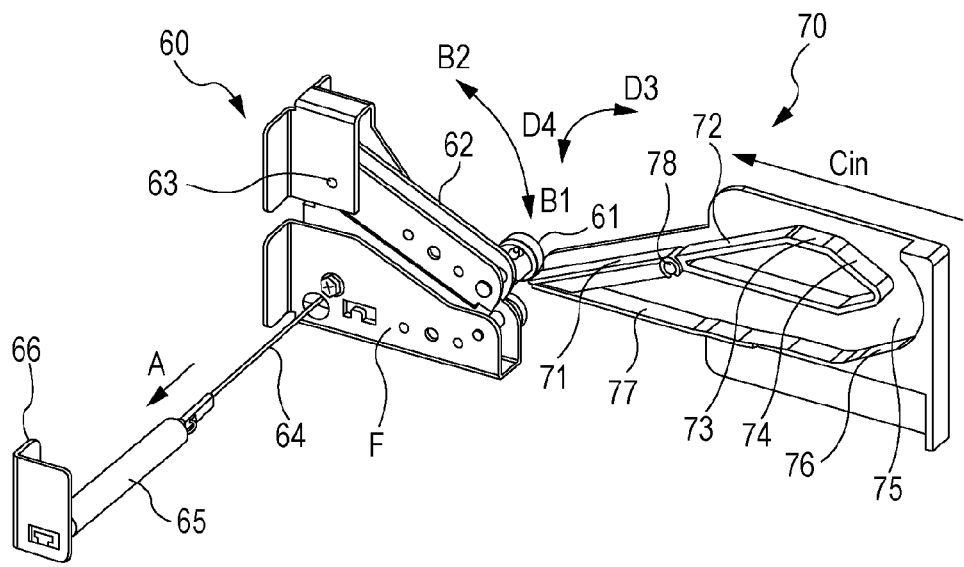
FIG. 1B is a perspective view of the unit moving device according to the first embodiment of the present invention.
Figure 5A:
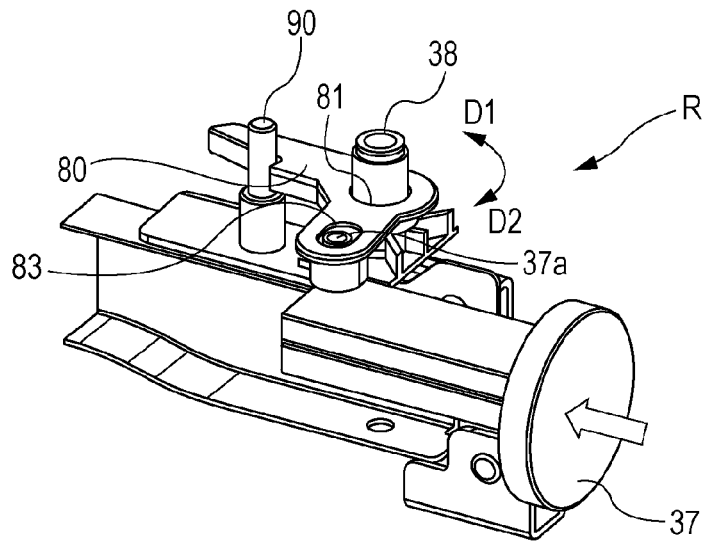
FIG. 5A is a perspective view of a retaining mechanism that retains a sheet feeding cassette.
Figure 6A:
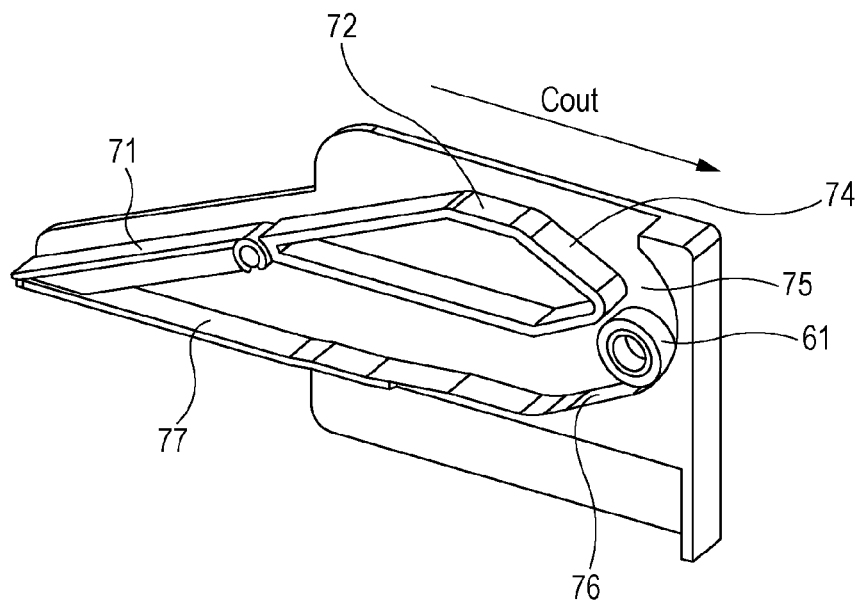
FIG. 6A is a perspective view illustrating an operation of the unit moving device illustrated in FIGS. 1A and 1B when the unit is being pulled out of the apparatus.
Figure 6B:
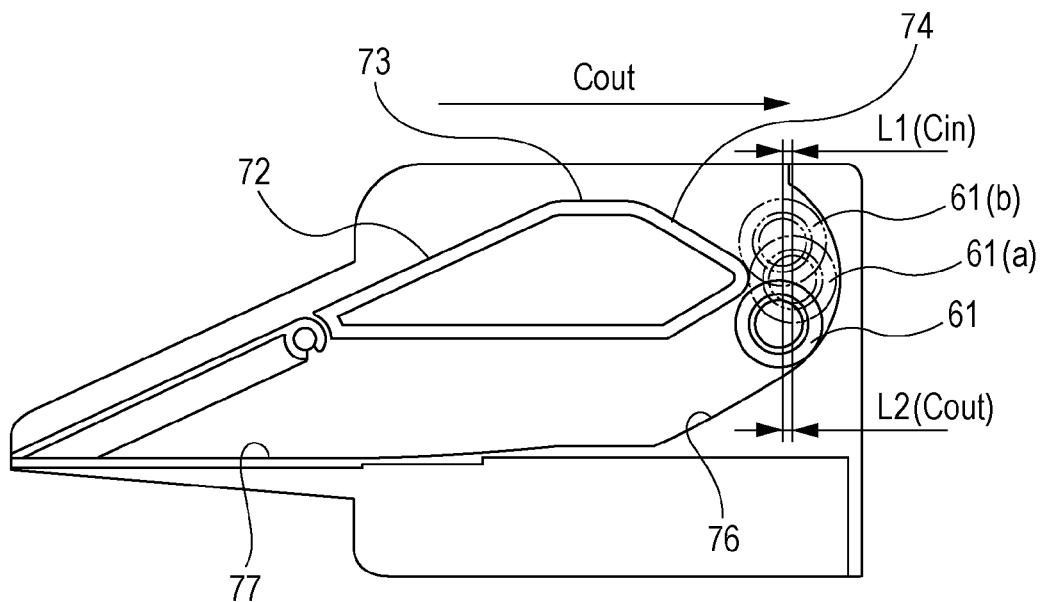
FIG. 6B is a front view illustrating the operation of the unit moving device illustrated in FIGS. 1A and 1B when the unit is being pulled out of the apparatus.
Figure 7A:
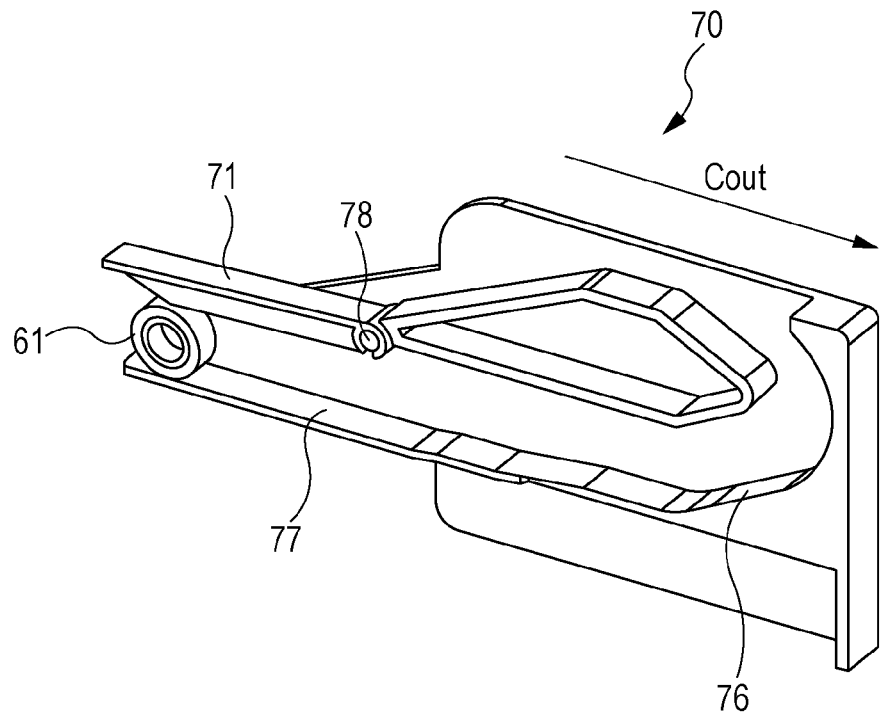
FIG. 7A is a perspective view illustrating the operation of the unit moving device illustrated in FIGS. 1A and 1B when the unit is being pulled out of the apparatus.
Figure 7B:
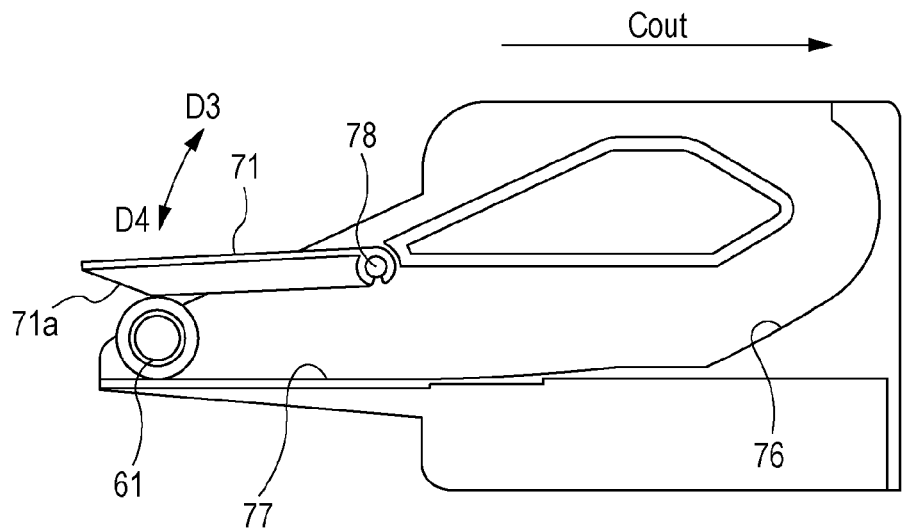
FIG. 7B is a front view illustrating the operation of the unit moving device illustrated in FIGS. 1A and 1B when the unit is being pulled out of the apparatus.
Figure 8A:
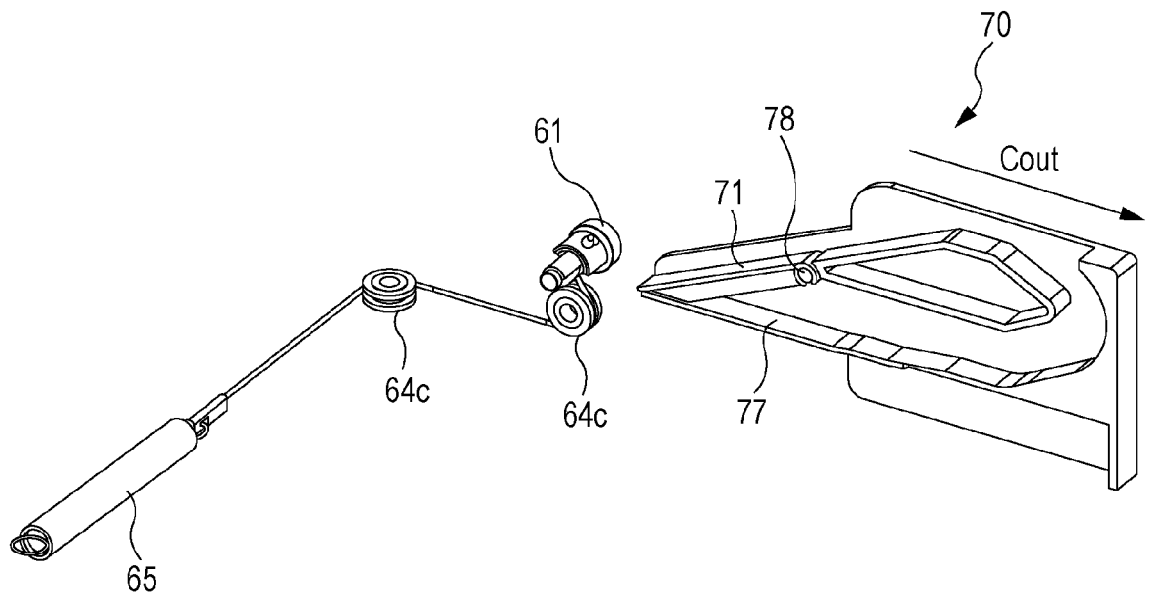
FIG. 8A is a perspective view of the unit moving device when the unit has been completely pulled out of the apparatus.
Figure 8B:
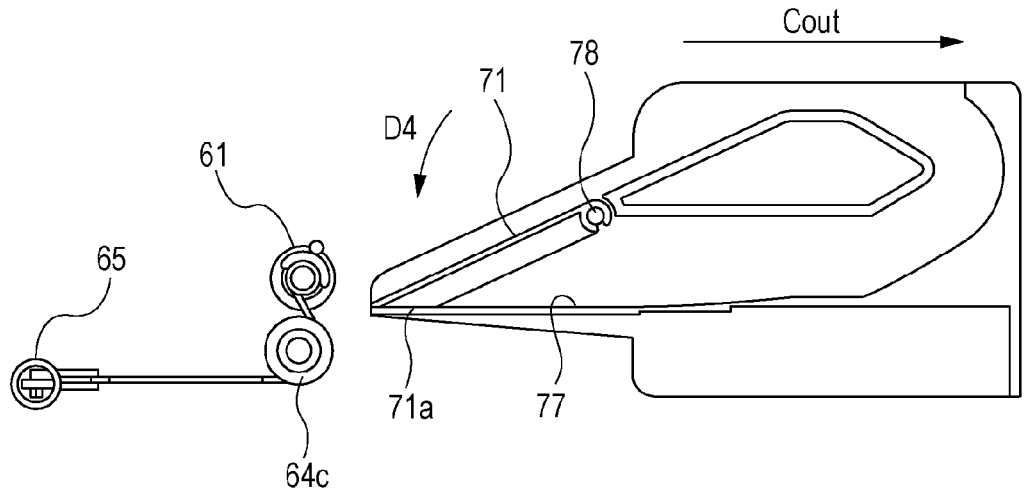
FIG. 8B is a front view of the unit moving device when the unit has been completely pulled out of the apparatus.

Next, the unit moving device according to the first embodiment of the present invention will be described. The present embodiment is described with an example of the sheet feeding cassette 34 as a unitized component. FIG. 1A illustrates a state in which the sheet feeding cassette 34 of the first embodiment according to the present invention is pulled out. FIG. 1B is a perspective view that illustrates in detail the unit moving device illustrated in FIG. 1A. FIGS. 2A to 4A are perspective views and FIG. 4B is a front view. These diagrams illustrate a series of operations from an operation in which the sheet feeding cassette 34 is removably inserted into the main body of the apparatus to an operation in which the sheet feeding cassette 34 is retained at a normal mounting position. FIGS. 6A, 7A, and 8A are perspective views and FIGS. 6B, 7B, and 8B are front views. These diagrams illustrate an operation in which the sheet feeding cassette 34 is pulled from the normal mounting position. FIGS. 5A to 5E illustrate a retaining mechanism that retains the sheet feeding cassette 34 at the normal mounting position in the main body of the apparatus.

Referring to FIGS. 1A and 1B, reference numeral 60 denotes a cassette moving mechanism, which is secured to a rear side plate (not shown) of the main body of the apparatus. The cassette moving mechanism 60 pulls the sheet feeding cassette 34 to the mounting position or pushes the sheet feeding cassette 34 out from the mounting position when the sheet feeding cassette 34 is mounted in or removed from the main body of the apparatus. Reference numeral 70 denotes a roller guiding portion that is integrally formed with a cassette main body 34a and guides a roller 61, which serves as a sliding member and is provided in the cassette moving mechanism 60, so as to generate force to pull or push the sheet feeding cassette 34. A moving device of the sheet feeding cassette 34 (unit moving device) includes the cassette moving mechanism 60 and the roller guiding portion 70 serving as a guiding mechanism. Reference numeral 37 in FIG. 1A denotes a release button that releases retaining of the sheet feeding cassette 34 having been retained at the normal mounting position in the main body of the apparatus using a retaining mechanism, which will be described later.

Figure 2A:
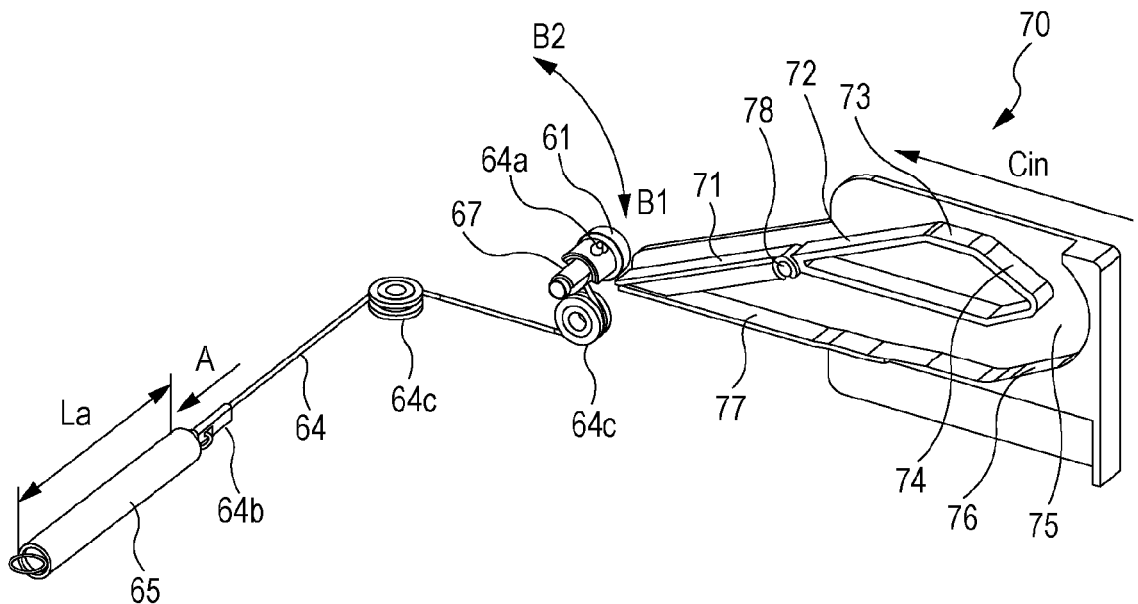
FIG. 2A is a perspective view illustrating an operation of the unit moving device illustrated in FIGS. 1A and 1B when a unit is pulled into an apparatus.

Referring to FIGS. 1A, 1B, and FIG. 2A, the structure of the moving device of the sheet feeding cassette 34 (unit moving device) will be described.

First, the cassette moving mechanism 60 that is secured to the rear side plate of the main body of the apparatus will be described. A frame F is secured to the rear side plate of the apparatus. An arm 62 is supported by the frame F so as to be swingable about a shaft 63 in a B1 or B2 direction in FIG. 1B relative to the frame F. A shaft 67 is secured to the arm 62 at an end of the arm 62. The roller 61 is rotatably attached on the shaft 67. One end 64a of a wire 64 is secured to the shaft 67, and the other end of the wire 64 is connected to one end of a tension spring 65 using a hook 64b. The tension spring 65, which stretches and contracts, serves as an elastic member and is set to an initial length of La. The other end of the tension spring 65 is secured to a metal spring hook 66, which is mounted on the rear side plate (not shown). The wire 64 is threaded through a plurality of pulleys 64c provided in the frame F.

The tension spring 65 as the elastic member is an extension spring that pulls the wire 64 using an elastic force that contracts in an arrow A direction. Thus, the wire 64 urges the arm 62 to rotate in an arrow B1 direction using the pulleys 64c and the shaft 67. That is, the roller 61 disposed at the end of the arm 62 is urged in the B1 direction (downward about the shaft 63).

Next, the structure of the roller guiding portion 70 that serves as the guiding mechanism and is secured to the sheet feeding cassette 34 will be described.

A flapper 71, which serves as a switching mechanism, is supported by a shaft 78 such that the flapper 71 is swingable about the shaft 78. The flapper 71 is urged by its own weight or a spring (not shown) such that a free end side, which is opposite to the shaft 78 side, contacts a roller guide 77 disposed below the flapper 71. The flapper 71 pivots about the shaft 78 in a D3 direction such that the flapper 71 allows movement of the roller 61 guided by the roller guide 77 when the roller 61 presses the flapper 71 from the inside of the roller guiding portion 70. The details of the roller guide 77 will be described later.

An inclined guide 72, which has an inclined surface and serves as a first guiding member, is disposed so as to be flush with an upper surface of the flapper 71 of which a free end is lowered. A flat guide 73 having a horizontal surface is connected to an end of the inclined guide 72. Furthermore, another inclined guide 74, which serves as a second guiding member, is connected to another end of the flat guide 73. The inclined guide 74 is formed so as to have a surface inclined in a direction opposite to the direction in which the inclined guide 72 is inclined.

An end of the inclined guide 74 folds back so as to have a V-shape, which defines a turnaround portion 75 together with an opposite surface. The turnaround portion 75 causes the roller 61 to move toward an opposite direction. An inclined guide 76, which serves as a third guiding member, is formed to have an inclined surface under the turnaround portion 75. The roller guide 77 is connected to the inclined guide 76. By connecting the guides as above, the roller 61 is guided so as to move in the following order. That is, from the upper surface of the flapper 71, the inclined guide 72 (first guiding member), the flat guide 73, the inclined guide 74 (second guiding member), the turnaround portion 75, the inclined guide 76 (third guiding member), and the roller guide 77.

The roller 61 serving as the sliding member is movable using the inclined guides of the roller guiding portion 70 in directions that intersect a direction in which the sheet feeding cassette 34 is mounted. By doing this, the arm 62 that holds the roller 61 swings. This swing of the arm 62 causes the wire 64 to pull the tension spring 65, thereby generating an elastic force.

FIGS. 5A to 5E illustrate a retaining mechanism R that retains the sheet feeding cassette 34 at the mounting position in the main body of the apparatus. The retaining mechanism R will be described below.

The main body of the apparatus has a positioning pin 90 secured thereto. The sheet feeding cassette 34 has a shaft 38 that is integrally formed therewith. By inserting the shaft 38 into a hole 81 formed in an L-shaped hook 80, the hook 80 is supported so as to be swingable in D1-D2 directions illustrated in FIG. 5A. The hook 80 is urged toward the D1 direction by a spring (not shown). A stopper portion 82, which is engageable with the positioning pin 90, is formed in one of legs of the L-shaped hook 80. The other leg of the hook 80 has a hole 83 formed therein. A shaft 37a formed on the release button 37 is inserted into the hole 83. When the release button 37 is pushed in an arrow direction, the hook 80 rotates in the D2 direction against an elastic force of a spring (not shown).

Figure 4A:
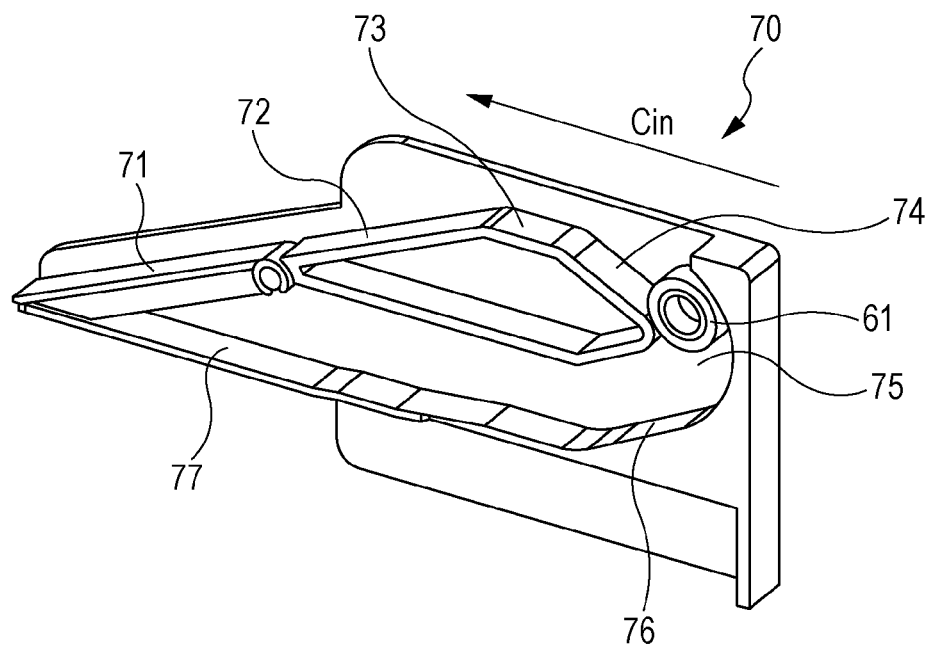
FIG. 4A is a perspective view illustrating the unit moving device illustrated in FIGS. 1A and 1B when the unit has been completely pulled into an apparatus.
Figure 4B:
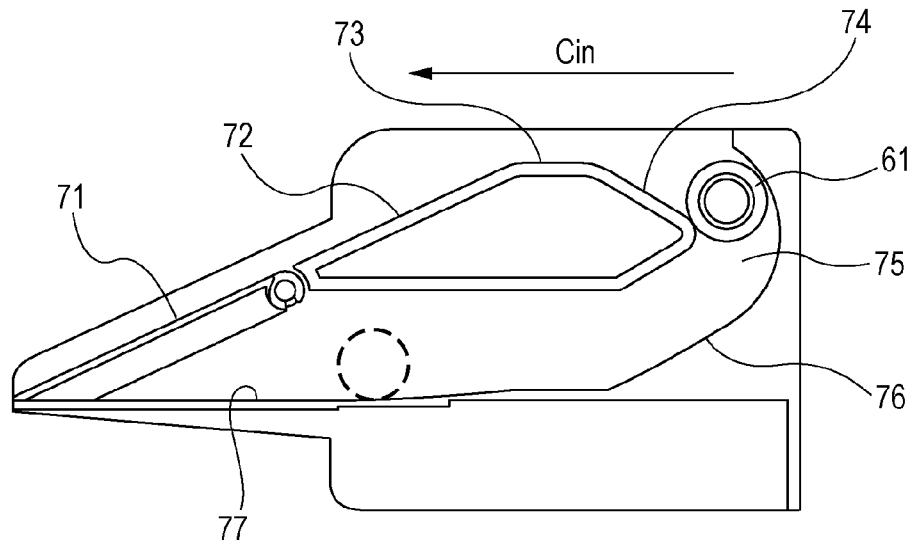
FIG. 4B is a front view illustrating the unit moving device illustrated in FIGS. 1A and 1B when the unit has been completely pulled into the apparatus.

When the stopper portion 82 of the hook 80 is engaged with the positioning pin 90, the sheet feeding cassette 34 is pulled inward using the roller guiding portion 70, so that the roller 61 is positioned at a lower end of the inclined guide 74 as illustrated in FIGS. 4A and 4B. In this state, the sheet feeding cassette 34 is retained by the retaining mechanism R, and the sheet feeding cassette 34 is positioned at the normal mounting position. By feeding sheets P from the sheet feeding cassette 34 mounted at this normal position, the sheets can be fed in a suitable position without occurrence of defective feeding such as feeding in the tilted position.

When the sheet feeding cassette 34 is at a normal pulled-in position as illustrated in FIG. 4B, the position of the roller 61 is higher than the position at which the roller 61 is guided by the roller guide 77 (position of the roller 61 indicated by a dashed circle). This causes the tension spring 65 to be stretched by the difference between these heights. That is, an elastic force that urges the roller 61 is accumulated in the tension spring 65 in an amount by which the tension spring 65 is stretched.

Next, operation of the cassette moving mechanism 60 and the roller guiding portion 70 included in the moving device of the sheet feeding cassette 34 (unit moving device) will be described with reference to FIGS. 2A to 8B.

Figure 2B:
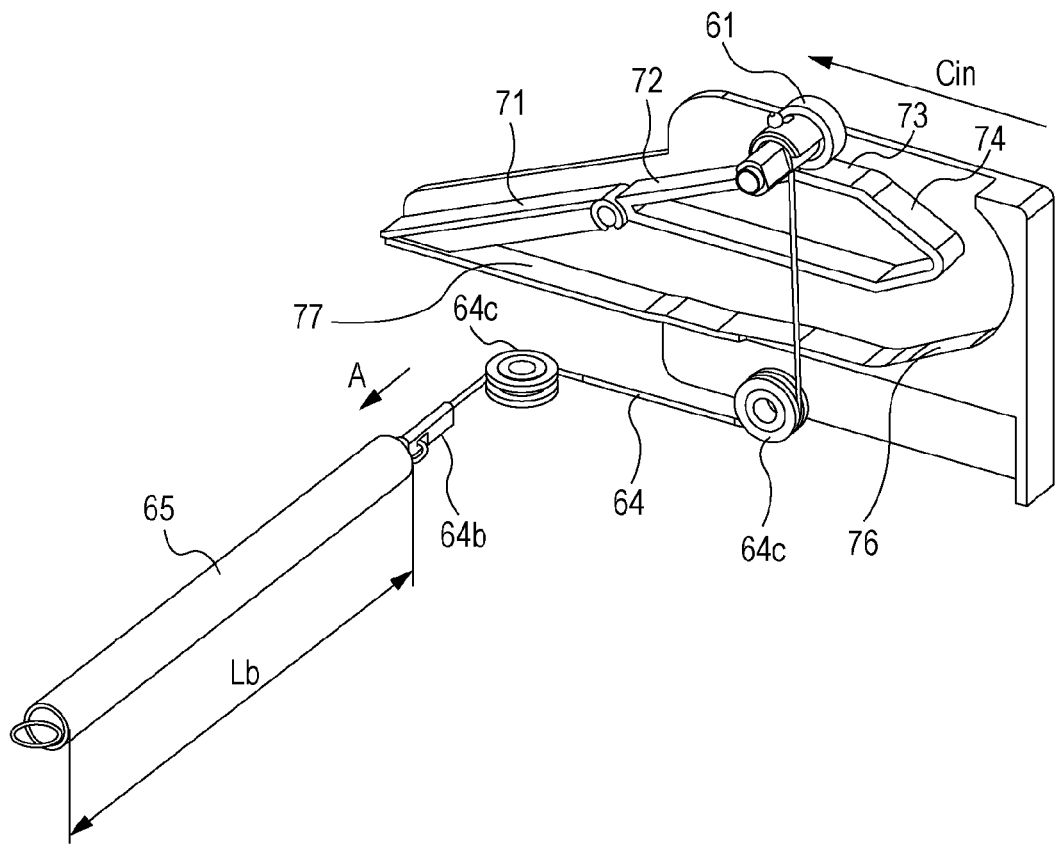
FIG. 2B is a perspective view illustrating the operation of the unit moving device illustrated in FIGS. 1A and 1B when the unit is pulled into the apparatus.

As illustrated in FIG. 2B, when an operator pushes the sheet feeding cassette 34 into the main body of the apparatus in an arrow Cin direction (insertion direction), the roller 61 of the cassette moving mechanism 60 is guided so as to ascend along the upper surface of the flapper 71 of the roller guiding portion 70. When the sheet feeding cassette 34 is further inserted in the arrow Cin direction, the roller 61 ascends along the upper surface of the flapper 71 and the inclined guide 72, and reaches the flat guide 73. While the roller 61 ascends along the upper surface of the flapper 71 and the inclined guide 72, the arm 62 is rotated about the shaft 63 in the arrow B2 direction using the roller 61, thereby pulling the wire 64 that is secured to the shaft 67 of the roller 61. This gradually stretches the tension spring 65, thereby increasing the elastic force.

When the roller 61 reaches the flat guide 73, the length of the tension spring 65 increases to the length Lb as illustrated in FIG. 2B, thereby urging the roller 61 toward the pulley 64c (downward) by the elastic force caused due to the stretch of the tension spring 65 by Lb−La, which is a difference in the length of the tension spring 65 between an initial length La and the stretched length Lb. In this state, the elastic force that urges the roller 61 in the arrow B1 direction is accumulated in the tension spring 65. At this time, an urging force exerted on the roller 61 is the maximum elastic force in this structure.

Figure 3:
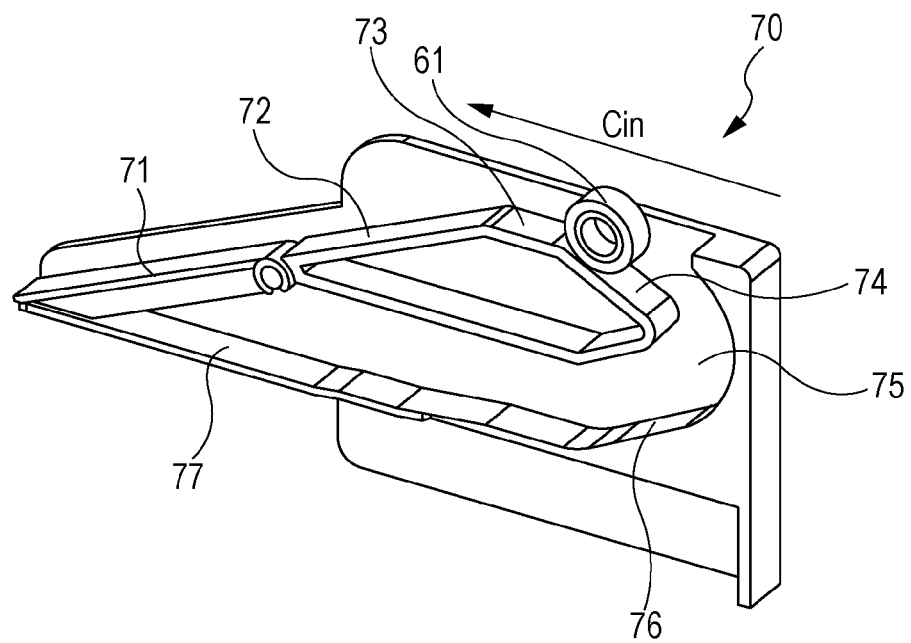
FIG. 3 is a perspective view illustrating the operation of the unit moving device illustrated in FIGS. 1A and 1B when the unit is pulled into the apparatus.

When the sheet feeding cassette 34 is further inserted in the arrow Cin direction, and the roller 61 having passed through the flat guide 73 is guided along the inclined guide 74 during insertion as illustrated in FIG. 3, releasing of the maximum elastic force accumulated in the tension spring 65 begins. In this state, the elastic force due to contraction of the tension spring 65 causes the roller 61 to press the inclined guide 74 in the arrow B1 direction. Due to a component in a horizontal direction (arrow Cin direction) of a pressing force in the B1 direction, the sheet feeding cassette 34 is pushed in the arrow Cin direction and automatically pulled inward. The sheet feeding cassette 34 is pulled to the normal position, which will be described later, in the main body of the apparatus.

Figure 5B:
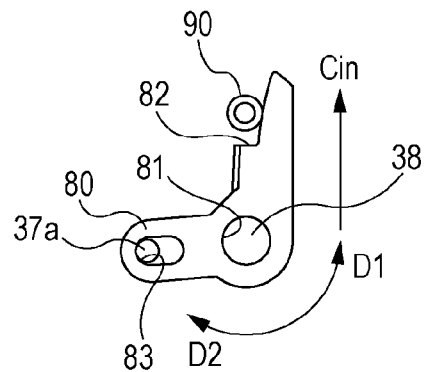
FIG. 5B illustrates an operation of the retaining mechanism that retains the sheet feeding cassette.
Figure 5C:
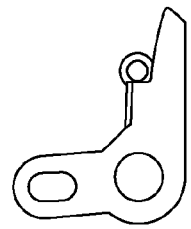
FIG. 5C illustrates the operation of the retaining mechanism that retains the sheet feeding cassette.
Figure 5D:
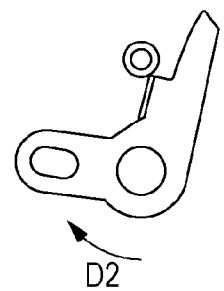
FIG. 5D illustrates the operation of the retaining mechanism that retains the sheet feeding cassette.
Figure 5E:
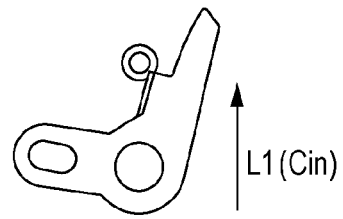
FIG. 5E illustrates the operation of the retaining mechanism that retains the sheet feeding cassette.

While the sheet feeding cassette 34 is being pulled inward, as illustrated in FIG. 5B, the stopper portion 82 of the hook 80 of the retaining mechanism R moves toward the positioning pin 90 secured to the main body of the apparatus. The stopper portion 82 of the hook 80 contacts the positioning pin 90 when the sheet feeding cassette 34 comes at the normal position. In this state, since the roller 61 is still descending along the inclined guide 74, the sheet feeding cassette 34 is urged toward the inner side (arrow Cin direction) of the main body of the apparatus. Since the stopper portion 82 of the hook 80 is engaged with the positioning pin 90, the sheet feeding cassette 34 is reliably retained at the normal position.

Next, an operation in which the sheet feeding cassette 34 is automatically pushed out toward the outer side (arrow Cout direction) of the main body of the apparatus will be described with reference to FIGS. 5A to 8B.

In order to pull out the sheet feeding cassette 34, the release button 37 illustrated in FIG. 5A is initially pressed in the arrow direction. When the release button 37 is pressed, the shaft 37a pushes the hook 80. The hook 80 rotates about the shaft 38 in an arrow D2 direction and the stopper portion 82 of the hook 80 is disengaged from the positioning pin 90 (a change from a state in FIG. 5C to states in FIGS. 5D and 5E).

In this state, when the stopper portion 82 of the hook 80 is disengaged from the positioning pin 90, the roller 61 causes the sheet feeding cassette 34 to be pulled toward the inner side (arrow Cin direction) of the main body of the apparatus by the distance L1 due to the remaining elastic force accumulated in the tension spring 65. That is, when the sheet feeding cassette 34 is retained at the normal position, the roller 61 has not yet reached the lower end of the inclined guide 74 as illustrated in FIGS. 4A and 4B. For this reason, when retaining of the sheet feeding cassette 34 using the retaining mechanism R is released, the roller 61 moves toward the lower end of the inclined guide 74, thereby pushing the sheet feeding cassette 34 in the insertion direction. Specifically, as illustrated in FIG. 6B, while moving from a position 61 (b) to a position 61 (a), the roller 61 presses the sheet feeding cassette 34, thereby moving the sheet feeding cassette 34 in the insertion direction (Cin direction).

As illustrated in FIGS. 6A and 6B, the roller 61 then passes through the turnaround portion 75 and moves to the inclined guide 76. Since the tension spring 65 is stretched from the initial length La by the difference in the height of the roller 61 sliding along the inclined guide 76, the roller 61 is urged in the arrow B1 direction and presses the inclined guide 76. The horizontal component of the urging force in the arrow B1 direction is directed so as to push the sheet feeding cassette 34 toward the outer side (arrow Cout direction) of the main body of the apparatus. Thus, the sheet feeding cassette 34 is automatically pushed out.

When the sheet feeding cassette 34 is automatically pushed toward the outer side (arrow Cout direction) of the main body of the apparatus and the roller 61 reaches the roller guide 77, the tension spring 65 contracts to its initial length of La and the elastic force that urges the roller 61 is lost. After that, the operator pulls out the sheet feeding cassette 34. When the sheet feeding cassette 34 is pulled out, the roller 61 pushes up the flapper 71 such that the flapper 71 is pivoted about the shaft 78 in the arrow D3 direction as illustrated in FIGS. 7A and 7B. Then the roller 61 moves out of the roller guiding portion 70. After the roller 61 has passed through, the flapper 71 is pivoted in the arrow D4 direction due to its own weight or using a spring (not shown), and the flapper 71 returns to a position where the free end 71a of the flapper 71 contacts the roller guide 77.

As described above, in the present embodiment, the roller 61 ascends along the inclined guide 72 of the roller guiding portion 70, thereby accumulating urging force in the tension spring 65. Part of the accumulated force is used to pull the sheet feeding cassette 34 toward the inner side (arrow Cin Direction) of the main body of the apparatus. The sheet feeding cassette 34 is retained at the normal position using the retaining mechanism R. After retaining of the sheet feeding cassette 34 using the retaining mechanism R is released, the sheet feeding cassette 34 is pushed toward the outer side (arrow Cout direction) of the main body of the apparatus using the urging force remaining in the tension spring 65.

According to the present embodiment, the sheet feeding cassette 34 is automatically pulled to a specified position in the main body of the apparatus and retained using a simple structure without using drive of a motor or the like, or using a large operational force. In addition, when starting to pull out the sheet feeding cassette 34 after retaining of the sheet feeding cassette 34 is released, the sheet feeding cassette 34 is automatically pushed out.

An alternative embodiment of the retaining mechanism will be described below with reference to FIGS. 9A to 9F.

With this structure, the sheet feeding cassette 34 is retained at or released from the normal position in a direction in which the sheet feeding cassette 34 is pushed toward the outer side (arrow Cout direction) of the main body of the apparatus. Components operating similarly to those of the retaining mechanism R illustrated in FIGS. 5A to 5E are denoted by similar reference numerals and detailed description thereof is omitted. With the retaining mechanism according to the alternative embodiment, when the sheet feeding cassette 34 is moved toward the inner side (arrow Cin Direction) of the main body of the apparatus and the inclined guide 74 is pushed in the arrow B1 direction by the roller 61, the sheet feeding cassette 34 is pulled toward the inner side (arrow Cin direction) of the main body of the apparatus. Since this operation is also similar to that using the retaining mechanism R, the description of the operation is omitted. The difference between a retaining mechanism R1 of the present embodiment and the retaining mechanism R illustrated in FIGS. 5A to 5E is that a direction in which the stopper portion formed in the hook and the positioning pin 90 is engaged with each other is reversed.

An elastic force of the tension spring 65 causes the roller 61 to press the inclined guide 74 in the arrow B1 direction. This causes the sheet feeding cassette 34 to further move toward the inner side (arrow Cin direction) of the main body of the apparatus after the sheet feeding cassette 34 has been pulled toward the inner side (arrow Cin direction) of the main body of the apparatus. Then, the roller 61 passes through the turnaround portion 75 and moves to the inclined guide 76. With the retaining mechanism R1 of the present embodiment, the sheet feeding cassette 34 is retained when the roller 61 has passed through the turnaround portion 75 and reaches the inclined guide 76.

In this state, a hook 100 disposed in the sheet feeding cassette 34 operates as follows. That is, the hook 100 is urged in the arrow D1 direction so as to rotate about the hole 81 into which the shaft 38, which is integrally formed with the cassette main body 34a, is inserted. Rotation of the hook 100 is restricted in a state illustrated in FIG. 9B. Regarding the hook 100 and the positioning pin 90, the sheet feeding cassette 34 is temporary pulled inward beyond the normal position, and an inclined surface 103 of the hook 100 goes beyond the positioning pin 90. After that, the hook 100 is pushed back toward the outer side (arrow Cout direction) of the main body of the apparatus by the distance L2 and returned to the normal position. This distance L2 is equal to L2 illustrated in FIG. 6B.

The retaining mechanism R1 is configured such that, when the roller 61 comes at an upper end of the inclined guide 76, a stopper portion 102 of the hook 100 contacts the positioning pin 90. Thus, the sheet feeding cassette 34 is retained at a normal position while the urging force that presses the sheet feeding cassette 34 toward the outer side (arrow Cout direction) of the main body of the apparatus is applied to the sheet feeding cassette 34. In this state, the elastic force that urges the roller 61 in the arrow B1 direction remains in the tension spring 65.

Next, an operation in which the sheet feeding cassette 34 is pushed toward the outer side (arrow Cout direction) of the main body of the apparatus will be described.

Figure 9A:
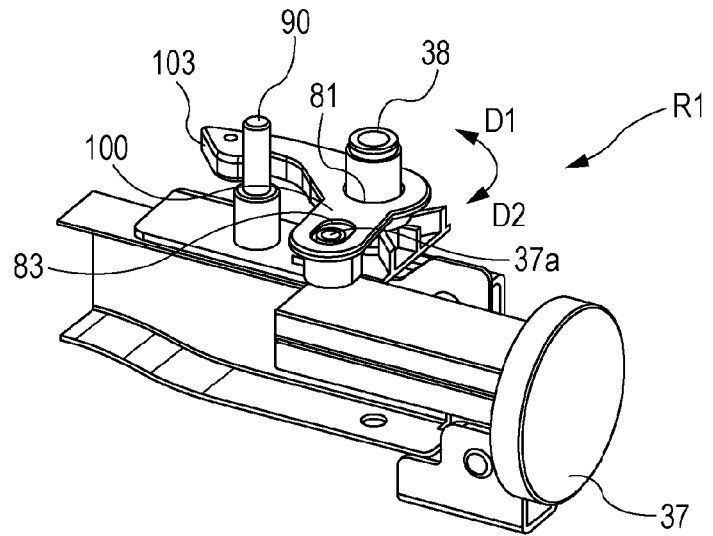
FIG. 9A is a perspective view of a retaining mechanism that retains the sheet feeding cassette according to an alternative embodiment.
Figure 9B:
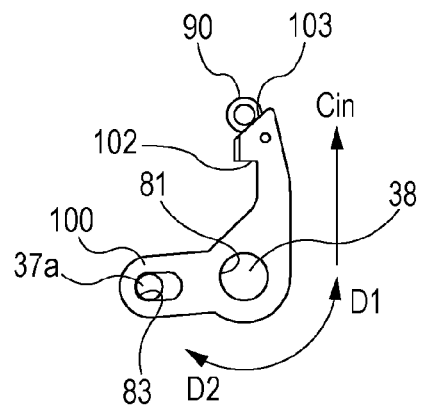
FIG. 9B illustrates an operation of the retaining mechanism that retains the sheet feeding cassette according to the alternative embodiment.
Figure 9C:
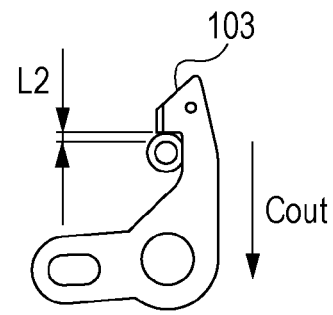
FIG. 9C illustrates the operation of the retaining mechanism that retains the sheet feeding cassette according to the alternative embodiment.
Figure 9D:
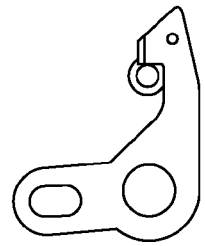
FIG. 9D illustrates the operation of the retaining mechanism that retains the sheet feeding cassette according to the alternative embodiment.
Figure 9E:
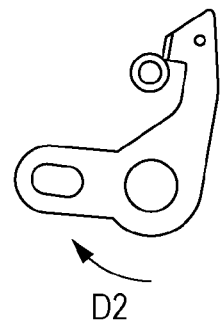
FIG. 9E illustrates the operation of the retaining mechanism that retains the sheet feeding cassette according to the alternative embodiment.
Figure 9F:
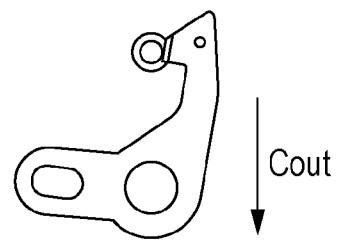
FIG. 9F illustrates the operation of the retaining mechanism that retains the sheet feeding cassette according to the alternative embodiment.

When the release button 37 is pressed, the hook 100 is rotated about the hole 81, into which the shaft 38 is inserted, in the arrow D2 direction using a link mechanism (not shown). This releases the stopper portion 102 from the positioning pin 90 (FIG. 9E). When the stopper portion 102 is released from the positioning pin 90, the urging force in the arrow B1 direction again causes the roller 61 to push the inclined guide 76, thereby pushing the sheet feeding cassette 34 toward the outer side (arrow Cout direction) of the main body of the apparatus (FIG. 9F).

Second Embodiment

Next, a moving mechanism of the sheet feeding cassette 34 (the unit moving device) according to a second embodiment of the present invention will be described. In the second embodiment, the structure of the roller guiding portion 70 is different from that in the first embodiment. Also in the second embodiment, the accumulating operation of the tension spring 65 serving as the elastic member is different from that of the tension spring 65 in the first embodiment in mounting the sheet feeding cassette 34. Similar to the first embodiment, in the second embodiment, part of the elastic force accumulated in the tension spring 65 is used as a pulling force when the sheet feeding cassette 34 is mounted in the main body of the apparatus, and, after retaining of the sheet feeding cassette 34 at the normal position is released, the remaining elastic force acts as force used to push the sheet feeding cassette 34 toward the outer side of the main body of the apparatus.

Figure 10A:
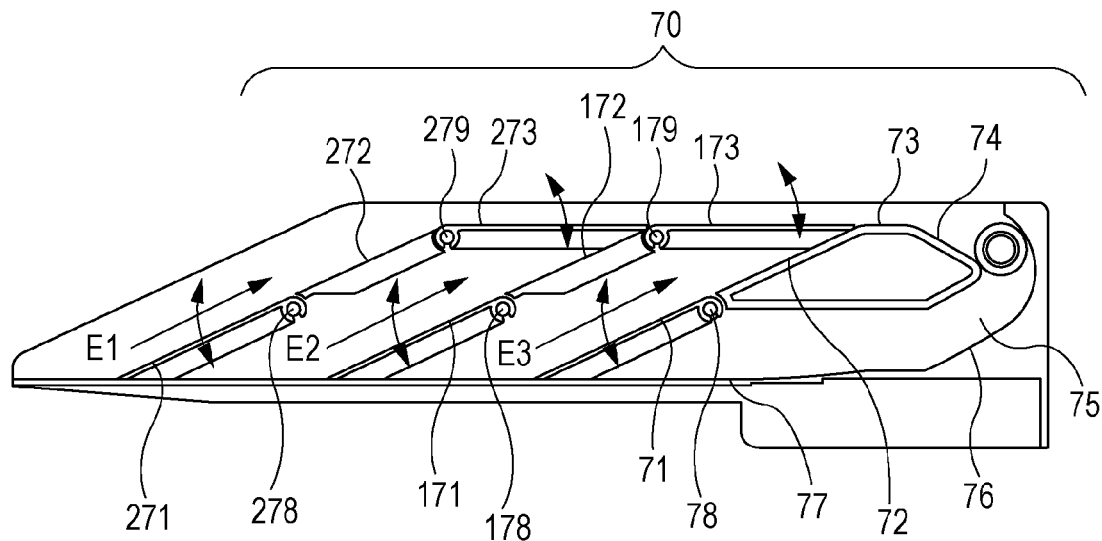
FIG. 10A is a front view of a unit moving device according to a second embodiment of the present invention.
Figure 10B:
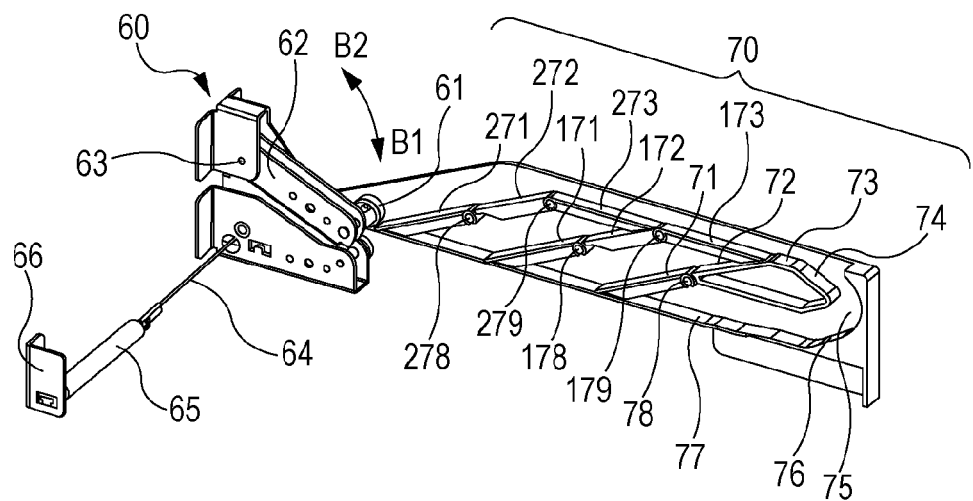
FIG. 10B is a perspective view of the unit moving device according to the second embodiment of the present invention.

As a structure according to the second embodiment, guide paths E1, E2, and E3 for the roller 61 are formed as illustrated in FIGS. 10A and 10B. Flappers 171 and 271 correspond to the flapper 71 of the first embodiment, and inclined guides 172 and 272 correspond to the inclined guide 72 of the first embodiment. The flappers 171 and 271 respectively pivot about shafts 178 and 278 in arrow directions illustrated in FIG. 10A. In order to allow the roller 61 to move from the guide paths E1 or E2 to the flat guide 73, and in order to guide the roller 61 from the guide paths E2 or E3 to the flat guide 73, flappers 273 and 173, which respectively pivot about shafts 279 and 179, are provided.

Figure 11:
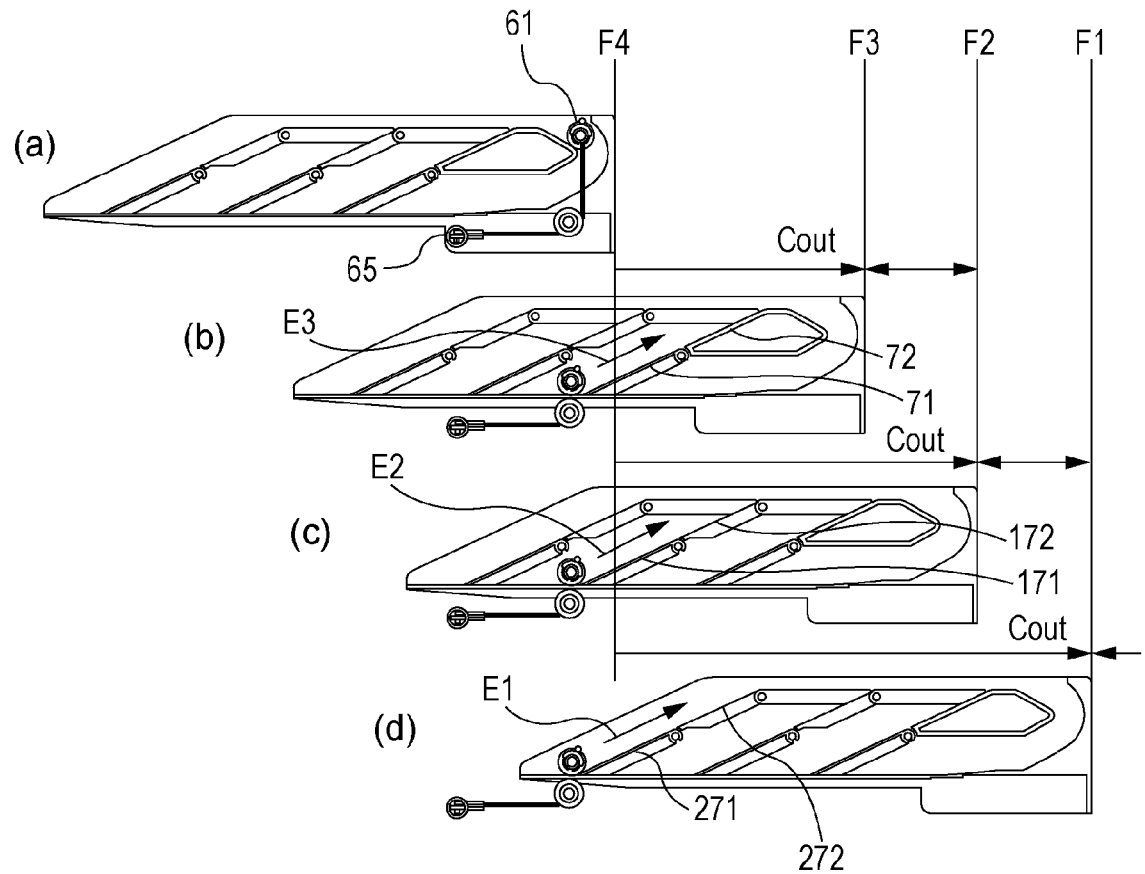
FIG. 11 includes front views illustrating positions of the unit moving device according to the second embodiment.

The difference between the first and second embodiments of the present invention is that, in the second embodiment, the operation that accumulates an elastic force in the tension spring 65 starts at a plurality of positions, which are different from each other and disposed in a direction in which the sheet feeding cassette 34 is mounted. Views (a) to (d) of FIG. 11 illustrate the difference in start positions corresponding to different pulled-out positions of the sheet feeding cassette 34. The start position refers to a position at which the roller 61 starts to ascend the inclined surface of the flapper 71, 171 or 271 and accumulation of the elastic force in the tension spring 65 starts. The position F4 illustrated in view (a) of FIG. 11 is a position where the mounted sheet feeding cassette 34 is retained. When the sheet feeding cassette 34 is released from the retaining mechanism R and pulled toward the outer side (arrow Cout direction) of the apparatus, the position of the roller guiding portion 70 relative to the roller 61 sequentially changes from a position illustrated in view (a) to a position illustrated in view (d) of FIG. 11.

When the sheet feeding cassette 34 is pulled out to a position between the positions F3 and F2, by again performing the operation of mounting the sheet feeding cassette 34, the start position of the roller 61 is set to that of the position F3 and the roller 61 moves along the guide path E3 guided by the flapper 71 and the inclined guide 72. When the sheet feeding cassette 34 is pulled out to a position between the positions F2 and F1, the start position of the roller 61 is set to that of the position F2 and the roller 61 moves along the guide path E2 guided by the flapper 171 and the inclined guide 172. Likewise, when the sheet feeding cassette 34 is pulled out beyond the position F1, the start position of the roller 61 is set to that of the position F1 and the roller 61 moves along the guide path E1.

According to the present embodiment, a plurality of start positions are provided to accumulate an elastic force of the tension spring 65. Thus, regardless of whether the distance by which the sheet feeding cassette 34 is pulled out is large or small, the sheet feeding cassette 34 can be mounted with similar operational sensation.

Third Embodiment

Figure 12A:
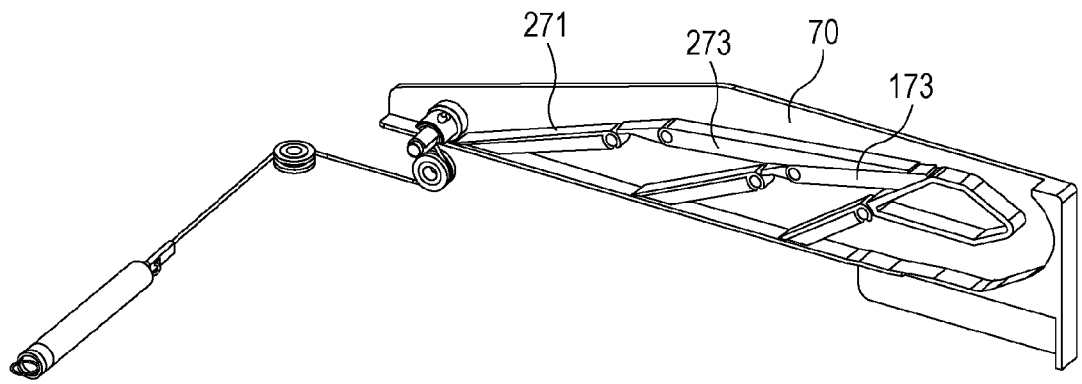
FIG. 12A illustrates a structure of a unit moving device according to a third embodiment.
Figure 12B:
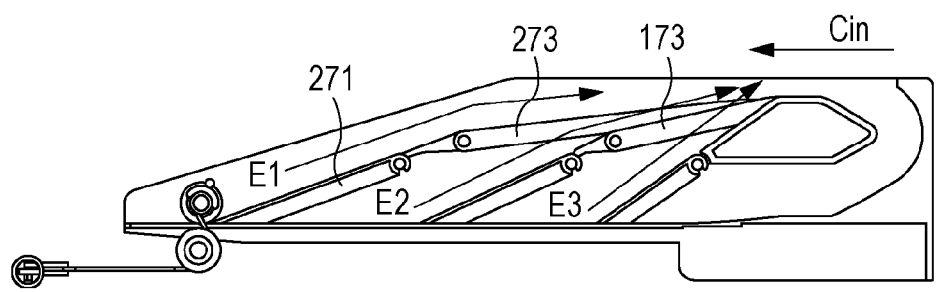
FIG. 12B illustrates the structure of the unit moving device according to the third embodiment.

FIGS. 12A and 12B illustrate in detail a unit moving device according to a third embodiment of the present invention. In the third embodiment, the structure of the roller guiding portion 70 is different from that in the second embodiment. As illustrated in FIG. 12B, the third embodiment uses the same structure of components as that of the second embodiment. Also similar to the second embodiment, the guide paths E1, E2, and E3 of the roller 61 are provided corresponding to the distance by which the sheet feeding cassette 34 is pulled out. Compared to the second embodiment, in the third embodiment, the distances of the inclined surfaces of the guide paths E1, E2, and E3 are different from each other, that is, the inclinations of the guiding surfaces, which are formed by the flappers 71, 171, and 271, and the inclined guides 72, 172, and 272, are different from each other.

In the present embodiment, inclination of the guiding surface of the guide path E1 is decreased, thereby increasing the distance required for accumulation of an elastic force in the tension spring 65. The guide path E1 is used when one of the sheet feeding cassette 34, which is regarded as the most frequently used among a plurality of sheet feeding cassettes 34, is pulled out by a large distance. The degree of an operational force required for the operator can be decreased by increasing the distance required for accumulation of the elastic force in the tension spring 65 without changing the amount of work required for the accumulation. When the sheet feeding cassette 34 is sometimes operated although not frequently used, and is pulled out by a small distance, a pulling force can be generated using the guide path E2 or E3, thereby allowing the sheet feeding cassette 34 to be reliably pulled in to the normal mounting position. As described above, as an insertion distance of the sheet feeding cassette 34 from the start position where accumulation of the elastic force in the tension spring 65 starts to a position where accumulation of the elastic force in the tension spring 65 is complete is increased, the ratio of an increase in the elastic force to be accumulated decreases. By doing this, the operational force in a most frequently performed case is decreased, and the sheet feeding cassette 34 pulled out by a small distance can be pulled back into the apparatus with decreased restrictions.

Although the embodiments according to the present invention have been described above, the present invention is not limited to these embodiments. For example, in each of the above-described embodiments, the cassette moving mechanism having the roller is disposed in the main body of the apparatus and the roller guiding portion is disposed in the sheet feeding cassette. Alternatively, the cassette moving mechanism having the roller can be disposed in the sheet feeding cassette and the roller guiding portion can be disposed in the main body of the apparatus. Instead of using a pair of sheet feeding cassette moving unit and the roller guiding portion, a plurality of sheet feeding cassette moving units and a plurality of roller guiding portions can be used.

Although the sheet feeding device is described as an example in the embodiments, the present invention is also applicable to a transfer portion that transfers toner images onto a sheet, or applicable to a transfer unit or a fixing unit of which a fixing device that fixes toner images to a sheet can be pulled out from the main body of the apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-251160, filed Nov. 9, 2010, which is hereby incorporated by reference herein in its entirety.

The invention claimed is:

1. A unit moving device that is provided between a main body of an apparatus and a unit, the unit being provided so as to be insertable to the main body of the apparatus, the unit being moved by the unit moving device in the main body of the apparatus, the unit moving device comprising:
   an elastic member that generates a force for moving the unit;
   a sliding member that is connected to the elastic member and is configured to accumulate an elastic force in the elastic member in an operation in which the unit is inserted to a mounting position in the main body of the apparatus; and
   a force receiving portion that is in contact with the sliding member and is configured to receive the force for moving the unit from the sliding member,
   wherein, part of the elastic force accumulated in the elastic member in the operation in which the unit is inserted to the mounting position in the main body of the apparatus is used for moving the unit to the mounting position, and remaining part of the elastic force accumulated in the elastic member in the operation in which the unit is inserted to the mounting position in the main body of the apparatus is used for moving the unit having moved to the mounting position in a direction in which the unit is pushed out of the main body of the apparatus.

2. The unit moving device according to claim 1, further comprising: a retainer that retains the unit at the mounting position,
   wherein the retainer retains the unit at the mounting position while the elastic force having been accumulated in the elastic member remains in the elastic member.

3. The unit moving device according to claim 1, wherein the amount of the elastic force accumulated in the elastic member reaches the maximum as the unit is being inserted, wherein, after the maximum elastic force has been accumulated, part of the accumulated elastic force is used to move the unit to the mounting position when the unit is further moved in a direction in which the unit is inserted, wherein the remaining elastic force accumulated in the elastic member is used to push the unit out of the main body of the apparatus.

4. The unit moving device according to claim 1, further comprising:
   a swingable arm; and
   a roller that is provided in the arm;
   wherein the sliding member is the roller,
   wherein the force receiving portion is a guiding member that is engaged with the roller so as to cause the roller to move, and
   wherein the elastic member comprises an extension spring, the extension spring being pulled by swinging of the arm so as to generate an elastic force, wherein the roller is moved by the guiding member in accordance with movement of the unit, wherein the movement of the roller swings the arm in order to pull the extension spring so as to accumulate the elastic force.

5. The unit moving device according to claim 1, wherein the force receiving portion includes a pulling guide portion inclined so as to move the unit to the mounting position in the main body of the apparatus by the elastic force accumulated in the operation in which the unit is inserted to the mounting position in the main body of the apparatus, and a pushing guide portion inclined in a direction different from inclination of the pulling guide portion, so as to move the unit in a direction in which the unit is pushed out of the main body of the apparatus.

6. A unit moving device that is provided between a main body of an apparatus and a unit, the unit being provided so as to be insertable to the main body of the apparatus, the unit being moved by the unit moving device in the main body of the apparatus, the unit moving device comprising:
   a sliding member that is provided in one of the main body of the apparatus and the unit, the sliding member being movable in a direction that intersects a direction in which the unit moves;
   an elastic member that is connected to the sliding member; and
   a guiding mechanism that is provided in the other one of the main body of the apparatus and the unit, wherein the guiding mechanism includes,
      an inclined first guiding member that guides the sliding member in order to stretch the elastic member so as to increase an elastic force while the unit is being inserted into the main body of the apparatus;
      an inclined second guiding member that guides the sliding member in order to contract the elastic member so as to decrease the elastic force from a time during insertion of the unit into the main body of the apparatus to a time when the unit reaches a mounting position of the unit in the main body of the apparatus; and
      an inclined third guiding member that guides the sliding member in order to contract the elastic member so as to decrease the elastic force through movement of the unit from the mounting position in a direction opposite to a direction in which the unit is inserted,
   wherein the sliding member is guided by the first guiding member so as to increase and accumulate the elastic force of the elastic member, wherein the unit is pushed to the mounting position by the elastic force exerted when the sliding member is guided by the second guiding member so as to decrease the elastic force of the elastic member, wherein the unit is pushed out from the mounting position by the elastic force exerted when the sliding member is guided by the third guiding member so as to decrease the elastic force of the elastic member, and wherein, in an operation in which the unit is inserted to a mounting position in the main body of the apparatus, the sliding member is guided along the first guiding member and the second guiding member, and in an operation in which the unit having moved to the mounting position is pulled out from the main body of the apparatus, the sliding member is not guided along the first guiding member but guided along the third guiding member.

7. The unit moving device according to claim 6, further comprising:

a swingable arm, wherein the sliding member includes a roller that is rotatably provided in the arm and connected to the elastic member with a wire, wherein the arm is swung by the roller being guided along the guiding members in order to stretch or contract the elastic member using the wire.

8. The unit moving device according to claim 7, wherein the first guiding member includes a switching mechanism, wherein, when the unit is inserted, the switching mechanism serves as part of a guiding surface of the first guiding member along which the roller is guided, wherein, when the unit is pulled out, the switching mechanism moves so as to form a path through which the roller can pass.

9. The unit moving device according to claim 6, further comprising a flapper, wherein the flapper includes a guide surface for guiding the sliding member from a predetermined position to the first guiding member when the unit is inserted to the mounting position, and wherein the flapper is rotatable about a shaft thereof in such a manner that when the unit is pulled out, the sliding member is capable of passing the flapper from a position opposite from the predetermined position with respect to the flapper to the predetermined position.

10. An image forming apparatus that includes a unit moving device that is provided between a main body of an apparatus and a unit, the unit being provided so as to be insertable to the main body of the apparatus, the unit being moved by the unit moving device in the main body of the apparatus, the image forming apparatus comprising:

an image forming portion configured to form an image on a sheet;

an elastic member that generates a force for moving the unit;

a sliding member that is connected to the elastic member and is configured to accumulate an elastic force in the elastic member in an operation in which the unit is inserted to a mounting position in the main body of the apparatus; and a force receiving portion that is in contact with the sliding member and is configured to receive the force for moving the unit from the sliding member, wherein, part of the elastic force accumulated in the elastic member in the operation in which the unit is inserted to the mounting position in the main body of the apparatus is used for moving the unit to the mounting position, and remaining part of the elastic force accumulated in the elastic member in the operation in which the unit is inserted to the mounting position in the main body of the apparatus is used for moving the unit having moved to the mounting position in a direction in which the unit is pushed out of the main body of the apparatus.

11. The image forming apparatus according to claim 10, further comprising:

a retainer that retains the unit at the mounting position, wherein the retainer retains the unit at the mounting position while the elastic force having been accumulated in the elastic member remains in the elastic member.

12. The image forming apparatus according to claim 10, wherein the amount of the elastic force accumulated in the elastic member reaches the maximum as the unit is being inserted, wherein, after the maximum elastic force has been accumulated, part of the accumulated elastic force is used to move the unit to the mounting position when the unit is further moved in a direction in which the unit is inserted, wherein the remaining elastic force accumulated in the elastic member is used to push the unit out of the main body of the apparatus.

13. The image forming apparatus according to claim 10, further comprising:

a swingable arm; and a roller that is provided in the arm, wherein the sliding member is the roller, wherein the force receiving portion is a guiding member that is engaged with the roller so as to cause the roller to move, and wherein the elastic member comprises an extension spring, the extension spring being pulled by swinging of the arm so as to generate an elastic force, wherein the roller is moved by the guiding member in accordance with movement of the unit, wherein the movement of the roller swings the arm in order to pull the extension spring so as to accumulate the elastic force.

14. The image forming apparatus according to claim 10, wherein the force receiving portion includes a pulling guide portion inclined so as to move the unit to the mounting position in the main body of the apparatus by the elastic force accumulated in the operation in which the unit is inserted to the mounting position in the main body of the apparatus, and a pushing guide portion inclined in a direction different from inclination of the pulling guide portion, so as to move the unit in a direction in which the unit is pushed out of the main body of the apparatus.

15. An image forming apparatus that includes a unit moving device that is provided between a main body of an apparatus and a unit, the unit being provided so as to be removable from the main body of the apparatus, the unit being moved by the unit moving device in the main body of the apparatus, the image forming apparatus comprising:

an image forming portion configured to form an image on a sheet;

a sliding member that is provided in one of the main body of the apparatus and the unit, the sliding member being movable in a direction that intersects a direction in which the unit moves;

an elastic member that is connected to the sliding member; and a guiding mechanism that is provided in the other one of the main body of the apparatus and the unit, wherein the guiding mechanism includes an inclined first guiding member that guides the sliding member in order to stretch the elastic member so as to increase an elastic force while the unit is being inserted into the main body of the apparatus, an inclined second guiding member that guides the sliding member in order to contract the elastic member so as to decrease the elastic force from a time during insertion of the unit into the main body of the apparatus to a time when the unit reaches the mounting position of the unit in the main body of the apparatus, and an inclined third guiding member that guides the sliding member in order to contract the elastic member so as to decrease the elastic force through movement of the unit from the mounting position in a direction opposite to a direction in which the unit is inserted, wherein the sliding member is guided by the first guiding member so as to increase and accumulate the elastic force of the elastic member, wherein the unit is pushed to the mounting position by the elastic force exerted when the sliding member is guided by the second guiding member so as to decrease the elastic force of the elastic member, wherein the unit is pushed out from the mounting position by the elastic force exerted when the sliding member is guided by the third guiding member so as to decrease the elastic force of the elastic member, and wherein, in an operation in which the unit is inserted to a mounting position in the main body of the apparatus, the sliding member is guided along the first guiding member and the second guiding member, and in an operation in which the unit having moved to the mounting position is pulled out from the main body of the apparatus, the sliding member is not guided along the first guiding member but guided along the third guiding member.

16. The image forming apparatus according to claim 15, further comprising:

a swingable arm, wherein the sliding member includes a roller that is rotatably provided in the arm and connected to the elastic member with a wire, wherein the arm is swung by the roller being guided along the guiding members in order to stretch or contract the elastic member using the wire.

17. The unit moving device according to claim 16, wherein a plurality of start positions is provided in the direction in which the unit is inserted, the start positions being positions from which the accumulation of the elastic force of the elastic member starts, wherein insertion distances of the unit from the different start positions to a position where accumulation of the elastic force of the elastic member is completed are different from each other.

18. The unit moving device according to claim 17, wherein as the insertion distance of the unit from the start position where accumulation of the elastic force of the elastic member starts to the position where accumulation of the elastic force of the elastic member is completed is increased, the ratio of an increase in the elastic force to be accumulated decreases.

19. The image forming apparatus according to claim 16, wherein the first guiding member includes a switching mechanism, wherein, when the unit is inserted, the switching mechanism serves as part of a guiding surface of the first guiding member along which the roller is guided, wherein, when the unit is pulled out, the switching mechanism moves so as to form a path through which the roller can pass.

20. The image forming apparatus according to claim 15, wherein a plurality of start positions is provided in a direction in which the unit is inserted, the start positions being positions from which the accumulation of the elastic force of the elastic member starts, wherein insertion distances of the unit from the different start positions to a position where accumulation of the elastic force of the elastic member is completed are different from each other.

21. The image forming apparatus according to claim 20, wherein as the insertion distance of the unit from the start position where accumulation of the elastic force of the elastic member starts to the position where accumulation of the elastic force of the elastic member is completed is increased, the ratio of an increase in the elastic force to be accumulated decreases.

22. The image forming apparatus according to claim 15, further comprising a flapper, wherein the flapper includes a guide surface for guiding the sliding member from a predetermined position to the first guiding member when the unit is inserted to the mounting position, and wherein the flapper is rotatable about a shaft thereof in such a manner that when the unit is pulled out, the sliding member is capable of passing the flapper from a position opposite from the predetermined position with respect to the flapper to the predetermined position.

* * * * *